United States Patent [19]
Cho

[11] 3,955,792
[45] May 11, 1976

[54] VALVE ACTUATOR MECHANISM

[75] Inventor: Nakwon Cho, Knoxville, Tenn.

[73] Assignee: Electro-Nucleonics, Inc., Fairfield, N.J.

[22] Filed: May 15, 1975

[21] Appl. No.: 577,948

[52] U.S. Cl. .................................. 251/69; 251/133; 251/138; 251/294; 254/174
[51] Int. Cl.² ........................................ F16K 31/44
[58] Field of Search ............... 251/68, 69, 133, 138, 251/294; 254/6, 174, 187 F, 161

[56] References Cited
UNITED STATES PATENTS

| | | | |
|---|---|---|---|
| 2,035,711 | 3/1936 | Lowndes | 251/69 |
| 3,290,010 | 12/1966 | Holmes | 254/161 |
| 3,447,777 | 6/1969 | Carlson | 251/294 X |

Primary Examiner—Henry T. Klinksiek
Attorney, Agent, or Firm—Cooper, Dunham, Clark, Griffin & Moran

[57] ABSTRACT

An actuating mechanism for a movable valve member which is spring biased toward a first valve position. A cable is coupled at one portion thereof to the movable valve member and is wound about a drum on another portion thereof. The drum winds the cable thereon and moves the valve to a second valve position. The drum is released to permit the valve member to move under the action of the biasing spring to the first valve position.

7 Claims, 5 Drawing Figures

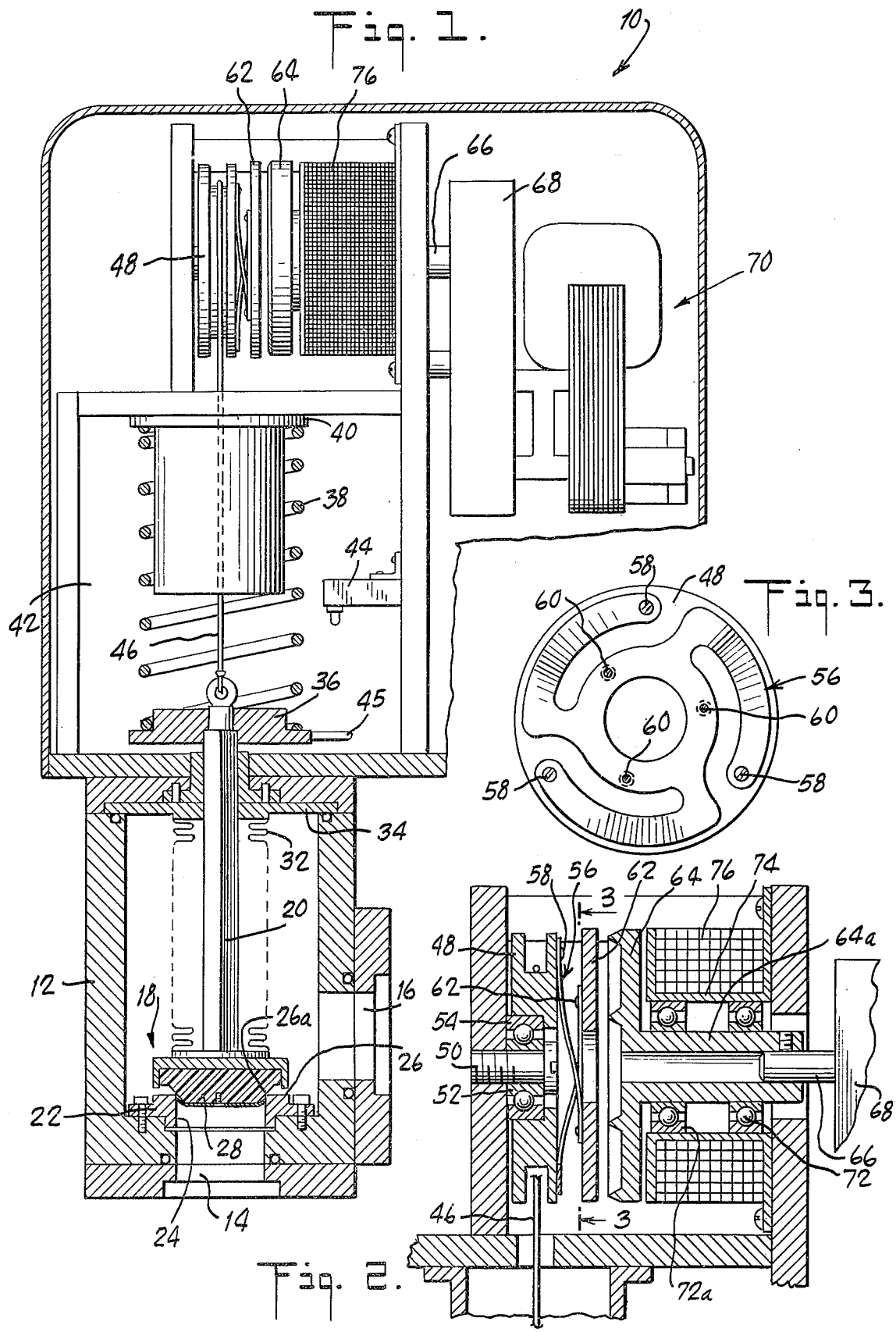

VALVE ACTUATOR MECHANISM

BACKGROUND AND BRIEF DESCRIPTION OF THE INVENTION

This invention relates to valve actuating mechanisms. More particularly, the invention provides a valve actuating mechanism which is extremely fast acting and which uses little power to move the mechanism to a desired operating position.

Spring biased valve actuating mechanisms have been employed in the past. Many are complicated, and many require large amounts of power during operation. The present invention, on the other hand, provides a valve actuating mechanism which is relatively simple in construction, is extremely fast acting, and it draws very little power.

Briefly, a spring biased valve mechanism is advantageously utilized together with a cable which is coupled at one portion thereof to a movable valve member and which is wound at another portion thereof about a drum. The drum is driven, advantageously through the mechanism of a clutch by a motor. The motor winds the cable about the drum until the movable valve member has moved from a first position, toward which it is normally biased, to a second position. When the second position is reached, the motor is de-energized and the drum is maintained in that position by any number of techniques. A first technique is to maintain the drum in contact with a motor-driven element through the use of a clutch (typically a solenoid clutch). The motor assembly may include a brake mechanism which brakes the motor from moving unless the motor is energized. Thus, as soon as the motor is de-energized corresponding to the movable valve member being in the second position, and the clutch mechanism is operative to couple together the drum and the motor-driven element, the valve member is retained in its second valve position. If the solenoid clutch is de-energized, the valve member immediately moves under the action of the spring biasing to the first valve position. Under this arrangement, the only power consumed is when the motor moves the valve from its first to second position and by the solenoid clutch.

An alternative arrangement is to couple a motor-driven element to a cable winding drum only during the movement of the valve member from its first to its second position. When in its second position, a ratchet mechanism engaging ratchet teeth on the drum serves to maintain the drum in the second valve position. The ratchet mechanism may be solenoid actuated, typically with a solenoid energization maintaining a ratchet member against the ratchet teeth on the drum. When the solenoid is de-energized, the ratchet member moves away from the ratchet teeth, permitting the drum to move by virtue of the spring biasing of the valve member permitting the valve member to return immediately to its first valve position.

In both of these alternative arrangements, a power on condition has been used to maintain the drum in a position corresponding to the second valve member position. Just the opposite could be completed, for example, the ratchet mechanism could be moved away from the ratchet teeth on the drum when power is applied to a solenoid mechanism rather than removed therefrom. In this case, no power is consummed while the valve is in the second position.

Patents representative of the state of the prior art are as follows:

U.S. Pat. No. 1,056,124 issued Mar. 18, 1913 - Rorke
U.S. Pat. No. 1,284,197 issued Nov. 5, 1918 - Larner & Taylor
U.S. Pat. No. 2,044,277 issued Jan. 16, 1936 - Bukolt
U.S. Pat. No. 2,259,973 issued Oct. 21, 1941 - Firehammer
U.S. Pat. No. 2,538,787 issued Jan. 23, 1951 - Manhartsberger
U.S. Pat. No. 2,827,259 issued Mar. 18, 1958 - Kindt
U.S. Pat. No. 3,447,777 issued June 3, 1969 - Carlson
U.S. Pat. No. 3,743,241 issued July 3, 1973 - Nansel
Gr. Britain Pat. No. 1,215,122 published Dec. 9, 1970

The invention will be more completely understood by reference to the following detailed description, to be read in conjunction with the appended drawings.

BRIEF DESCRIPTION OF THE DRAWINGS

FIG. 1 is a partly sectional view of a valve mechanism embodying the present invention.

FIG. 2 is a sectional view, to an enlarged scale, of part of the mechanism shown in FIG. 1.

FIG. 3 is a view looking in the direction of the arrows 3—3 in FIG. 2.

DETAILED DESCRIPTION

Figure 4:
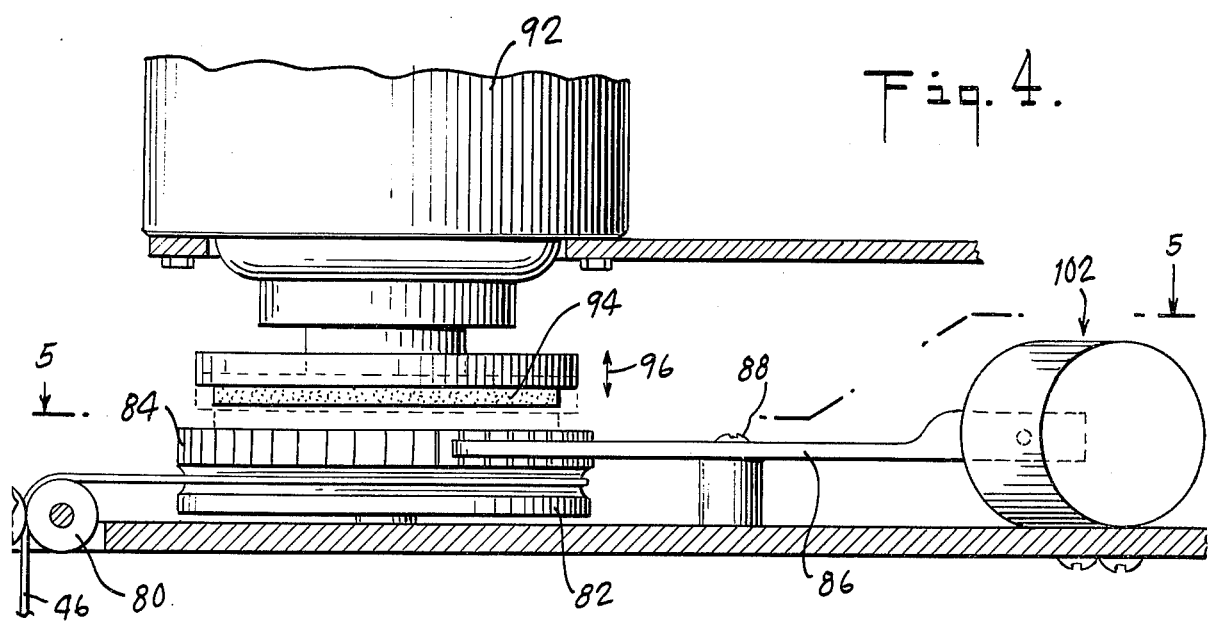
FIG. 4 shows an alternative valve actuating mechanism embodying the invention.

Referring to FIG. 1, there is shown a valve mechanism 10 embodying the invention. The mechanism 10 includes a valve assembly housing 12 in which inlet port 14 and outlet port 16, are located. A movable valve member 18 closes off the inlet port 14. The valve member 18 is driven by a shaft 20 that moves vertically in the orientation of the valve assembly 12 shown in FIG. 1.

The valve seat portion of the valve assembly 12 is defined by a valve member 22 which may be screwed or otherwise adhered to a part of assembly housing 12. The valve seat member 22 may also be an integral part of that housing. In any event, the valve seat member 22 includes a passage 24 of circular section therethrough. Upper surface 26 of the valve seat member is planar and leads directly and at a right angle into the passage 24. The edge 26a of the planar surface 26 constitutes the actual valve seat in the valve assembly 12.

The movable valve member 18 includes a valve head 28 of resilient material such as Teflon and which is in the shape of a frumstum of a cone. Attached to the lower end of the valve head 28 is a flexible circular disc 30 used to wipe away particles of dirt from the valve seat 26a. In the closing off of these valves, a sealing contact is made between the valve head 28 and the valve seat 26a, the flexible disc 30 being used solely to clean the valve seat 26a. The details of the valve head, flexible disc and valve seat structures are explained more completely in application Ser. No. 577,947, filed concurrently with the current application.

The movable valve member 18 includes a bellows 32 attached at one end to the movable valve member and at its other end to top plate 34 of the valve assembly 12. The bellows is used for sealing purposes to prevent fluid within the assembly 12 from escaping except through the outlet port 16.

Valve stem 20 passes through the plate 34 and includes an actuating plate 36 affixed to the top end thereof. The valve member 18 is biased in the valve closed position by a spring 38 which bears against plate 36 at one end thereof and against a fixed plate 40 secured to the top of chamber 42 within which the spring 38 is located. Also positioned within the chamber 42 is a limit switch 44 which is actuated by actuator arm 45 attached to the plate 36. The actuator arm 45 actuates the limit switch 44 when the movable valve member has been moved to an upper, valve open position.

The upper end of the valve stem 20 is attached to a cable 46. Another portion of the cable is wound about a drum 48.

Refer now to FIG. 2 which shows the details of the drum 48 more clearly. The drum 48 is rotatable about an axis the same as the central axis of screw 50. That screw secures in place the inner race 52 of a bearing. The outer race 54 of the bearing is pinned or otherwise suitably secured to the drum 48. A spring 56, whose shape is as shown in FIG. 3, is secured to the drum 48 by means of screws 58. Screws 60 secure other parts of the spring 56 to a clutch plate 62. Accordingly the clutch plate 62 is joined to the drum 48 by means of the spring 56. The spring 56 tends to urge the clutch plate 62 toward the drum 48.

The clutch plate 62 is positioned adjacent to a ferromagnetic plate 64 which includes a shaft portion 64a that is pinned to motor shaft 66 driven via a gear box 68 by a drive motor assembly 70 (see FIG. 1). The ferromagnetic plate 64 is free to rotate about an axis the same as that of the axis of the drum 48 by virtue of bearing assembly 72. The outer race 72a of the bearing assembly is secured to a plate 74 inside of which a solenoid 76 is positioned.

When the solenoid 76 is energized, the clutch plate 62 is drawn against the action of the spring 56 into contact with the ferromagnetic plate 64. At this time, rotation of the motor driven shaft 66 will cause the clutch plate 62 and, through the coupling provided by the spring 56, the drum 48 to rotate. Such action takes place when the drum 48 is rotated so as to wind the cable 46 on the drum and to move the valve member 18 from the lower most or valve closed position shown in FIG. 1 to an upper position at which the limit switch 44 is actuated. Upon the actuation of the limit switch, the drive motor assembly 70 is deenergized. The drive motor assembly 70 is typically one in which, when the motor is deenergized, the motor is braked against further movement. As long as the solenoid 76 remains energized, retaining the clutch plate 62 against the ferromagnetic disk 64, the drum 48 cannot rotate, and the valve member 18 is retained in its valve open position. When it is desired to close the valve, the solenoid 76 is deenergized. At that time the clutch plate 62 moves away from the plate 64, and the drum 48 is free to rotate under the biasing action of the spring 38. The valve member 18 thus moves immediately and decisively to the valve closed position shown in FIG. 1.

By use of the low current drive motor assembly 70, a relatively small amount of power is required to move the valve member 18 from its closed to its open position. The solenoid 76 may be one in which little power is consumed in remaining energized. Accordingly, the system shown in FIG. 1 is susceptible of extremely fast action and little power drain.

Figure 5:
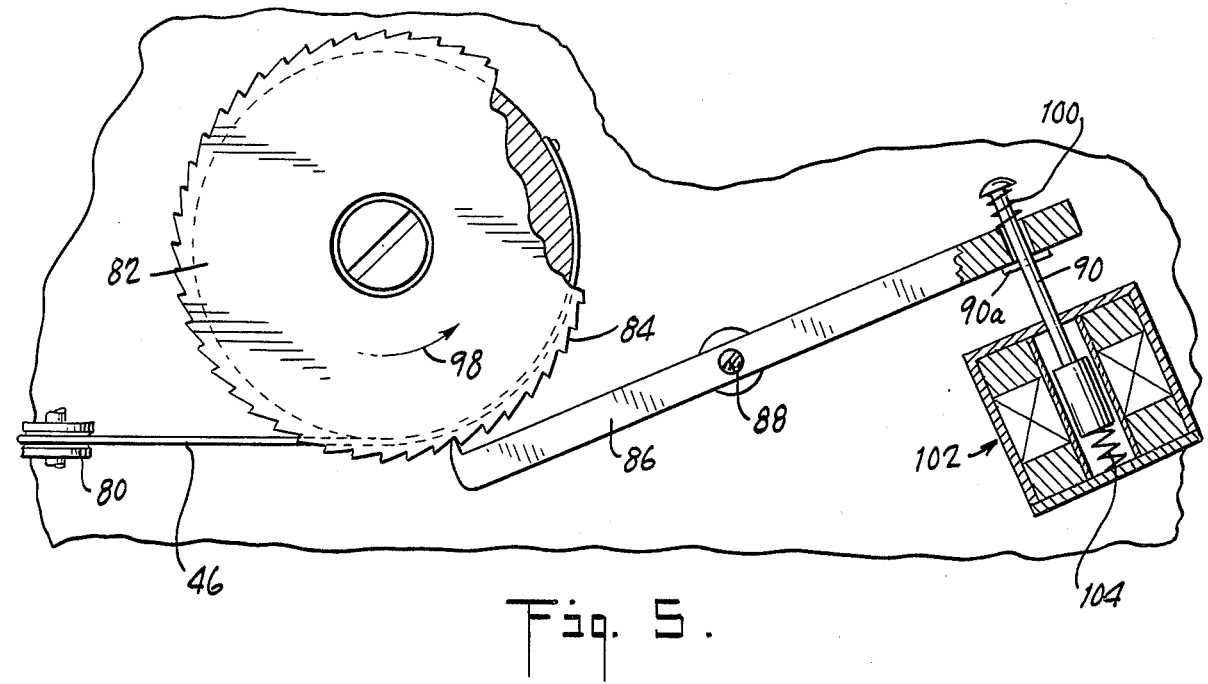
FIG. 5 is a view looking in the direction of the arrows 5—5 in FIG. 4.

An alternative system is shown in FIGS. 4 and 5. In this case, cable 46 passes about a pulley 80 and is wound about drum 82 mounted for rotation about a vertical axis as compared with the horizontal axis of rotation in the arrangement of FIG. 2. The periphery of the drum 82 includes ratchet teeth 84 thereon which are engaged by ratchet arm 86. The ratchet arm 86 pivots about a shaft 88, and the movement of the ratchet arm 86 is controlled by a solenoid driven lever 90.

A motor 92 drives the drum 82 through the mechanism of a clutch 94. The clutch moves in the direction of the with the 96 in FIG. 4, into and out of contact with drum 82. When the motor 92 is energized, the drum 82 is rotated to wind the cable 46 thereon and to move the movable valve member 18 of FIG. 1 as described in connection with the embodiment shown in FIGS. 1–3. The winding movement of the drum 82 is as shown by the arrow 98 in FIG. 5, namely, in a counterclockwise direction. The ratchet arm 86 permits such movement of the drum by movement of the right-hand end of the ratchet arm against spring 100. When the motor 92 stops rotating, as under the control of the limit switch 44 of FIG. 1, the clutch mechanism 94 need not make further contact with the drum 82, since the drum will be retained in position by the ratchet arm. Thus, if the clutch 94 is of the same general type as shown in FIG. 2, it need only be energized during the same time that the drive motor 92 is energized in moving the valve member 18 from its valve closed to valve open position.

When it is desired to return the movable valve member to the valve closed position, the solenoid 102 is deenergized. That solenoid controls movement of rod 90 which includes pin 90a thereon. When the solenoid 102 is energized, the solenoid is in the position shown in FIG. 5. When the solenoid is deenergized, the rod 90 is moved by spring 104 outwardly, which by virtue of the pin 90a moves the ratchet arm 86 counterclockwise about the shaft 88. This moves the ratchet arm out of engagement with the ratchet teeth 84, permitting the drum 82 to move clockwise and to permit the movable valve member 18 to move to the valve closed position.

In the embodiment of FIGS. 4 and 5, the only energization required during the time that the movable valve member 18 is in its stationary valve open position is the power to retain the solenoid 102 energized. This power drain can be very little. Alternatively, solenoid 102 could be arranged to move the ratchet arm 86 only upon energization thereof, in which case the power drain during the valve open position would be zero. In many applications, however, it may be desirable to sense appropriate operation of a system through the generating of a control signal. This control signal would be used to energize the solenoid 102 to retain the ratchet arm 86 against the ratchet teeth 84 and to retain the movable valve member 18 in the valve open position. Only upon failure of the control signal, for example, as evidencing a failure of some part of a process, would the solenoid 102 be deenergized, resulting in immediate closure of the movable valve member 18.

A unique fast acting, low power drain valve actuating mechanism has been disclosed. The representative and presently preferred embodiments of the invention which have been described in detail above are subject to modification by those skilled in the art. Accordingly, the invention should be taken to be defined by the following claims.

What is claimed is:

1. An actuating mechanism for a movable valve member which is biased toward a first valve position comprising a cable adapted to be coupled at one portion thereof to said movable valve member, a drum upon which another portion of said cable is wound, drive means for selectively driving said drum to wind said cable thereon and to move said valve member to a second valve position, and control means for releasing said drum to permit said valve member to move under the action of said biasing to said first valve position.

2. An actuating mechanism according to claim 1 in which said drive means comprises a motor.

3. An actuating mechanism according to claim 2 in which said control means comprises a clutch coupling said motor to said drum, said motor including a braking means to inhibit movement thereof except when said motor is energized, said motor when energized causing said drum to be driven to move said valve member to said second valve position, said clutch releasing said drum from said motor to return said valve member to said first valve position.

4. An actuating mechanism according to claim 2 in which said drum includes ratchet teeth thereon, a ratchet engaging said ratchet teeth to maintain said drum in position, and said control means comprises means for disengaging said ratchet from said ratchet teeth.

5. An actuating mechanism according to claim 4 including a clutch coupling said motor to said drum.

6. An actuating mechanism according to claim 5 in which said control means includes a solenoid which, when energized, maintains said ratchet in engagement with said ratchet teeth.

7. An actuating mechanism according to claim 6 in which the bias of said movable valve member is achieved by a spring bearing against said movable valve member and which is compressed when said movable valve member moves from said first to said second valve position.

* * * * *